Jan. 16, 1962 A. A. HIRSCH 3,016,731
DUST RING MOUNTED CHANGE GEAR FINDING SCALE
FOR WATER METER TESTING
Filed Sept. 8, 1958

INVENTOR

Abraham Adler Hirsch

United States Patent Office 3,016,731
Patented Jan. 16, 1962

3,016,731
DUST RING MOUNTED CHANGE GEAR FINDING
SCALE FOR WATER METER TESTING
Abraham Adler Hirsch, 141 Norwood St.,
Shreveport, La.
Filed Sept. 8, 1958, Ser. No. 759,665
5 Claims. (Cl. 73—3)

In a copending application, Serial No. 658,825, I have shown the utility, construction and method of operation of an auxiliary gear-finding scale for use in connection with several types of so-called test registers in the testing of water meters, particularly in the selection of proper sets of change gears to give the desired accuracy of registration. The object of the present invention is to further simplify the features of the gear-finding scale for those registers equipped with a so-called sweep hand, which by virtue of the larger divided circle provided at the circumference of the register dial, obviates the necessity of mounting an extraneous test register dial when testing for accuracy.

A further object of this invention is to utilize the dust ring, generally provided for protection of the register movement, as a mounting means for the gear-finding scale, so as to enable an operator to read off immediately the proper pair of change gears needed for adjusting the registration as closely as possible to 100%, without the necessity of reference to charts, tables, or calculations.

Figure 1:
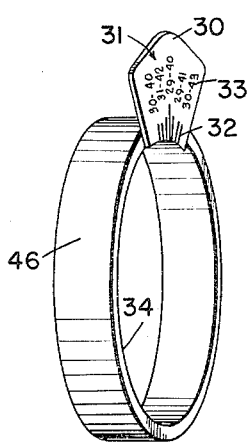
Figure 2:
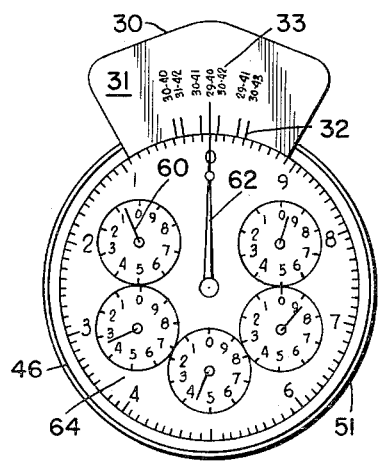
Figure 3:
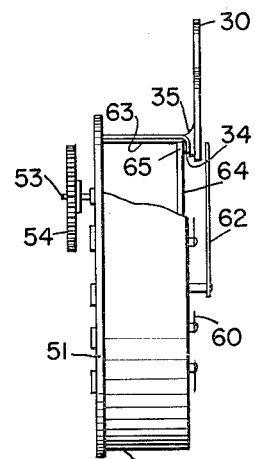

Construction of two types of dust ring mounted gear-finding scales for water meters, or similarly constructed meters for fluids in general, are shown in the accompanying drawings in which FIGURES 1, 2, and 3 illustrate various views of a type in which the gear-finding scale is fixed to a removable external band slipped around the dust ring, FIGURE 1 being a perspective of the new device, FIGURE 2 showing in plan the gear-finding scale mounted on the dust ring of a register, and FIGURE 3 showing the corresponding side elevation and partial section.

Figure 4:
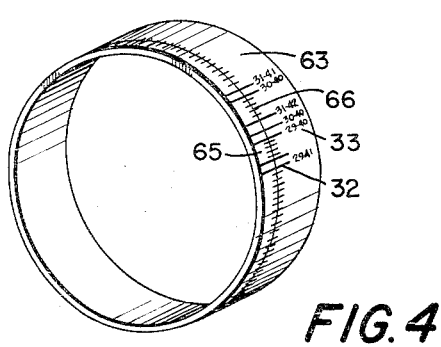
Figure 5:
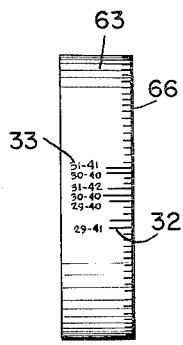
Figure 6:
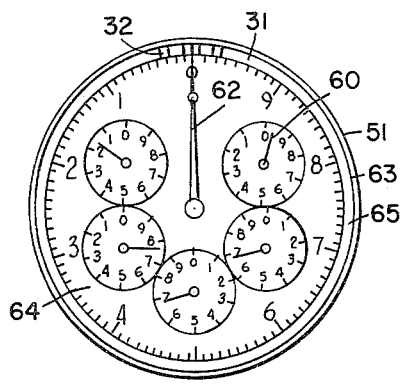

FIGURES 4, 5, and 6 show a gear-finding scale integral with the dust ring itself, FIGURE 4 showing the dust ring, with suitable graduations, in perspective, FIGURE 5 a side elevation, and FIGURE 6 a plan view of the graduated dust ring in place on a register.

Identifying numerals have fixed significance throughout all drawings.

Referring to FIGURES 1, 2, and 3: over the dust ring 63 of a register with a sweep hand 62 on its dial face 64 is slipped closely fitting external band 46 to which is soldered or otherwise affixed a flat sector 30 on which is marked the auxiliary gear-finding scale 31 with graduations 32 and gear designations 33. Lip 34 of band 46 overlays lip 65 of the dust ring 63; the other edge of the external band rests on the bottom plate 51 of the register assembly. Sweep hand 64 passes over the graduations of the gear-finding scale. Small hands, such as 60, show multiple accumulations, as usual.

Power is received from the stuffing box gear on the meter body, not shown, and transmitted to the register change gear 54 on upshaft 53. Range of registry of the meter is provided by choice of gearing from a set with various number of teeth which the manufacturer has available. The purpose of this invention is to facilitate selection of these two gear wheels.

Referring to FIGURES 4, 5 and 6: the dust ring 63 bearing gear-finding graduations 32 and gear designations 33 directly marked on the top rim and side thereof is slipped, as usual for an ordinary dust ring, over the sides of the register, leaving exposed the dial face 64, sweep hand 62 and small accumulator hands such as 60. A ridged set of grooves 66 is pressed at the corner of the dust ring for rigidity and to permit hand gripping to rotate the ring when setting gear marks 32.

Theoretically, the gear-finding scale is graduated according to the logarithm of the reduction ratios of the various pairs of change gears available for the particular meter under test, however for practical purposes the divisions may be arithmeitc based on percent difference in registration corresponding to different sets of change gears. In effect, the gear-finding scale shows the difference between actual registration and 100% accuracy in terms of the gear change required to eliminate the error.

The method of use is as follows: A gear-finding scale specific for the meter under test is applied either on a band slipped over the dust ring, or as a dust ring suitably marked directly. The mark on the gear-finding scale corresponding to the prevailing change gears is brought opposite the zero of the sweep hand scale, the sweep hand itself having been properly zeroed according to good practice. A cubic foot or 10-gallon quantity, in the case of 5/8" domestic service meters, is run through and the movement of the sweep hand noted with respect to registration, for purpose of record only and with respect to the gear-finding scale. The closest mark on the gear-finding scale indicates at once the proper set of change gears to select for the most accurate registration.

If some other percent registration is desired, as 99%, the prevailing gear mark is set opposite 99 on the sweep hand circle. The final sweep hand position after test points to the proper gearing.

I claim as new the following:
1. The combination in a liquid meter undergoing test for accuracy of registration, a set of change gears therein, a register with a dial and sweephand thereon, a dust ring around the edge of said register, said sweephand being rotated in response to revolutions of said change gears and an auxiliary scale appropriately graduated in terms of change gear combinations rotatably mounted on said dust ring so as to permit slidable adjustment at the periphery of said register dial, graduations on said auxiliary scale being on an arc concentric with said dial face so that the sweephand points thereto, readings for the purpose of change gear selection for said liquid meter being made according to the position of said sweephand with reference to said auxiliary scale.

2. The combination of claim 1 in which the graduations of the gear-finding scale are marked directly on the lip and side of the dust ring, said dust ring being serrated circumferentially at its corner to facilitate handling.

3. The combination of claim 1 in which the auxiliary gear finding scale consists of a flat sector bearing appropriate graduations fixed to an external band which fits slidably over the dust ring of said register, and a lip on said band to overlay the lip of said dust ring and support said sector.

4. For fluid meters employing change gears to transmit motion ultimately to drive a sweephand pointer over a register, the edge of said register being enclosed in a dust ring, a method for selecting change gear combinations to obtain the proper accuracy of registration comprising the several steps of connecting said meter to discharge fluid into an accurately calibrated receiving tank, slipping a band bearing an auxiliary gear finding scale over the dust ring of said register, aligning the mark on said gear finding scale corresponding to the change gears present in the meter with the zero of the register, drawing liquid through the meter to waste until the sweephand points to zero on the register, then passing through the meter a quantity of fluid represented by a single complete revolution of the sweephand into said receiving tank, and noting the final position of the sweephand with respect to the gear finding scale, the reading thereon indicating directly the proper set of change gears for accurate registration of the meter being tested.

5. For fluid meters employing change gears to transmit motion ultimately to drive a sweephand pointer over the register, the edge of said register being enclosed in a dust ring, a method for selecting change gear combinations to obtain the proper accuracy of registration comprising the several steps of marking the margin of the dust ring according to the speed reduction ratios of the various sets of change gears available, connecting said meter to discharge fluid into an accurately calibrated receiving tank, adjusting said dust ring to align the mark corresponding to the change gears present in the meter with the zero of the register of said meter, zeroing the meter by discharging fluid to waste until the sweephand points to the zero of the register, then passing a test volume of liquid corresponding to a full revolution of the sweephand through said meter into the calibrated receiving tank, and reading on the gear finding scale opposite the final position of the sweephand the proper set of change gears to provide accurate registration.

References Cited in the file of this patent

UNITED STATES PATENTS

| | | |
|---|---|---|
| 43,036 | Martin | June 7, 1864 |
| 1,073,386 | Bassett | Sept. 6, 1913 |